(12) United States Patent
Osgood et al.

(10) Patent No.: US 8,500,333 B2
(45) Date of Patent: Aug. 6, 2013

(54) SELF ALIGNING OIL FILM BEARING

(75) Inventors: Peter N. Osgood, Westborough, MA (US); Thomas C. Wojtkowski, Shrewsbury, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 266 days.

(21) Appl. No.: 13/114,407

(22) Filed: May 24, 2011

(65) Prior Publication Data
US 2012/0301063 A1    Nov. 29, 2012

(51) Int. Cl.
*F16C 23/04* (2006.01)

(52) U.S. Cl.
USPC .......................................... 384/192; 384/208

(58) Field of Classification Search
USPC ........................ 384/192, 202, 203, 206–209
See application file for complete search history.

(56) References Cited

U.S. PATENT DOCUMENTS

| | | | | |
|---|---|---|---|---|
| 3,801,395 A | * | 4/1974 | Stuck | 384/203 |
| 3,887,248 A | * | 6/1975 | Riegler | 384/206 |
| 4,268,094 A | | 5/1981 | Greene | |
| 4,600,317 A | | 7/1986 | Mori | |
| 5,205,652 A | | 4/1993 | Chapman | |
| 5,463,811 A | * | 11/1995 | Aureli et al. | 384/208 |
| 5,482,380 A | | 1/1996 | Corratti | |
| 5,718,517 A | * | 2/1998 | Morando | 384/192 |
| 5,743,657 A | | 4/1998 | O'Reilly | |
| 6,004,037 A | * | 12/1999 | Harris et al. | 384/206 |
| 6,039,399 A | * | 3/2000 | Whalen et al. | 384/209 |
| 7,311,445 B2 | | 12/2007 | New | |
| 7,497,628 B2 | | 3/2009 | Shepherd | |

FOREIGN PATENT DOCUMENTS

| | | |
|---|---|---|
| DE | 102008047270 A1 | 4/2010 |
| GB | 1172567 A | 12/1969 |
| GB | 1535803 A | 12/1978 |
| JP | 2002327737 A | 11/2002 |
| JP | 2010121644 A | 6/2010 |

OTHER PUBLICATIONS

Spherical Plain Bearing: THK General Catalog (12 pages).
R. Description of the Spherical Bearing (13 pages).
PCT International Search Report mailed Jul. 23, 2012 corresponding to PCT International Application No. PCT/US2012/037421 filed May 11, 2012 (11 pages).

* cited by examiner

*Primary Examiner* — Thomas R Hannon

(57) ABSTRACT

An oil film bearing for rotatably supporting a shaft comprises a spherical housing having a bore in which the shaft is rotatably supported, and an outer spherical surface. A chock contains the spherical housing. The chock is internally configured with an inner spherical surface coacting with the outer spherical surface of the spherical housing to define a raceway configured to accommodate angular rotation of the shaft about a central point.

15 Claims, 5 Drawing Sheets

SELF ALIGNING OIL FILM BEARING

BACKGROUND

1. Field of the Invention

Embodiments of the present invention relate to hydrodynamic oil film bearings used to rotatably support large heavily loaded shafts in various industrial applications.

2. Description of Related Art

There are large shafts (equal to or greater than one meter in diameter) that are subjected to highly loaded rotating applications, where the loads can be applied in variable radial directions. The rotational speeds of such shafts, while not high, also can be variable and can include so called "quiver", where the shafts experience small oscillatory movements for protracted periods of time without undergoing a complete revolution. In many cases, the shafts also are subjected to bending moments, which can cause misalignment of bearing surfaces.

Large roller bearings are not well suited for use on shafts that experience quiver, as they are unable to maintain the very thin elasto-hydrodynamic film that supports the rollers.

Oil film bearings can provide a practical alternative to roller bearings. Oil film bearings, particularly when used with high viscosity fluids, have shown that they can carry impressive radial loads for indefinite periods of time under a wide range of speed conditions. However, a requirement for the proper functioning of such bearings is that they be able to align themselves with the shafts, particularly in highly loaded applications.

SUMMARY

Briefly described, embodiments of the present invention relate to an improved self aligning oil film bearing. As herein employed, the term "oil film bearing" includes both hydrodynamic bearings, where the oil film is generated only through rotation of the shaft, and hybrid oil film bearings, where a combination of hydrodynamic and hydrostatic film generating features are employed simultaneously.

The oil film bearing of the present invention is designed to rotatably support a large heavily loaded shaft. The bearing has a central axis and includes a spherical housing having a bore in which the shaft is rotatably contained. The spherical housing has an outer spherical surface coacting with an inner spherical surface of the chock to define a raceway configured to accommodate angular rotation of the shaft about a central point.

In exemplary embodiments of the invention, the shaft is journalled for rotation in a bushing fixed within a bore of the spherical housing.

Preferably, the chock is axially subdivided into two mating half sections which are assembled around the externally spherical housing.

In other exemplary embodiment of the invention, the inner spherical surface of the chock is defined by discrete inserts interposed between a cylindrical interior surface of the chock and the spherical housing. Circular arrays of the inserts are contained in each chock half section.

The inserts have spherical interior surfaces, and preferably have three-dimensionally curved outer surfaces in contact with the cylindrical interior surface of the chock. Preferably, the three dimensionally curved outer surfaces of the inserts have a radius of curvature greater than the radius of curvature of their spherical interior surfaces in planes containing the bearing central axis, and a radius of curvature less than that of the cylindrical interior surface of the chock in a plane perpendicular to the bearing central axis.

In another exemplary embodiment of the invention, means are provided for resiliently urging the inserts into contact with the cylindrical interior surface of the chock.

In still another exemplary embodiment of the invention, thrust pads are secured to a circular end of the spherical housing. The thrust pads are configured and arranged to axially engage a retaining shoulder on the shaft.

These and other embodiments, objects, features and advantages of the present invention will become more apparent upon reading the following specification in conjunction with the accompanying drawing figures.

DETAILED DESCRIPTION

Figure 1:
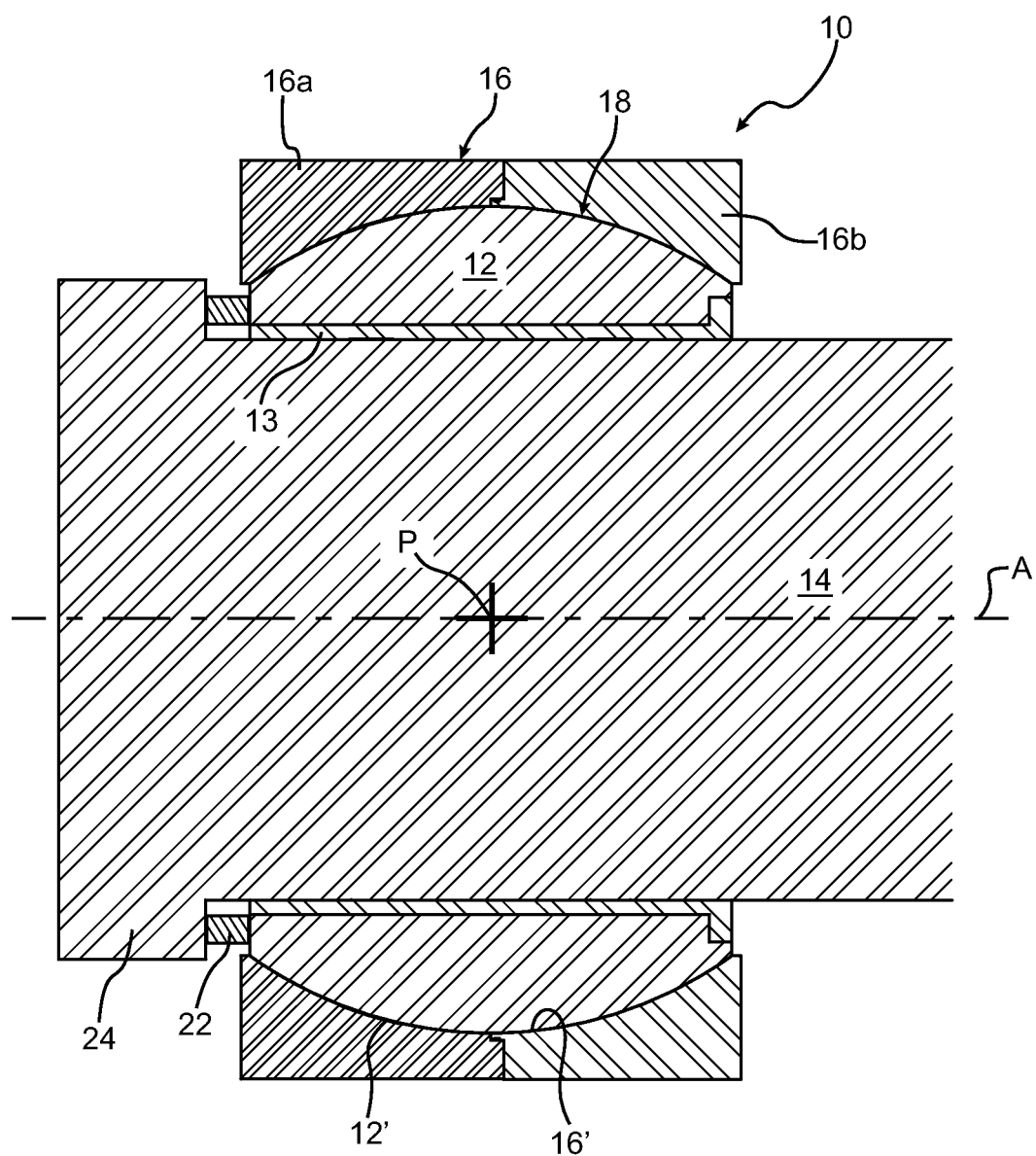
FIG. 1 is a longitudinal sectional view of an oil film bearing depicting an exemplary embodiment of the present invention.

To facilitate an understanding of embodiments, principles, and features of the present invention, they are explained hereinafter with reference to implementation in illustrative embodiments.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Referring now to the figures, wherein like reference numerals represent like parts throughout the views, embodiments of the present invention will be described in detail.

With reference initially to FIG. 1, an oil film bearing in accordance with the present invention is generally depicted at 10. The bearing has a central axis "A" and comprises a spherical housing 12 having a bore preferably lined with a bushing 13 within which a shaft 14 is rotatably journalled.

A chock 16 contains the spherical housing 12. The spherical housing has an outer spherical surface 12', and the chock is internally configured with an inner spherical surface 16'. The complimentary spherical surfaces 12' and 16' coact in defining a raceway 18 configured to accommodate angular rotation of the shaft about a central point "P".

The chock 16 is preferably axially subdivided into two mating half sections 16a, 16b which are assembled around the spherical housing 12 and held together by conventional fasteners (not shown).

Preferably, thrust pads 22 are secured to a circular end of the spherical housing. The thrust pads are configured and arranged to axially engage a shoulder 24 on the shaft.

Figure 2:
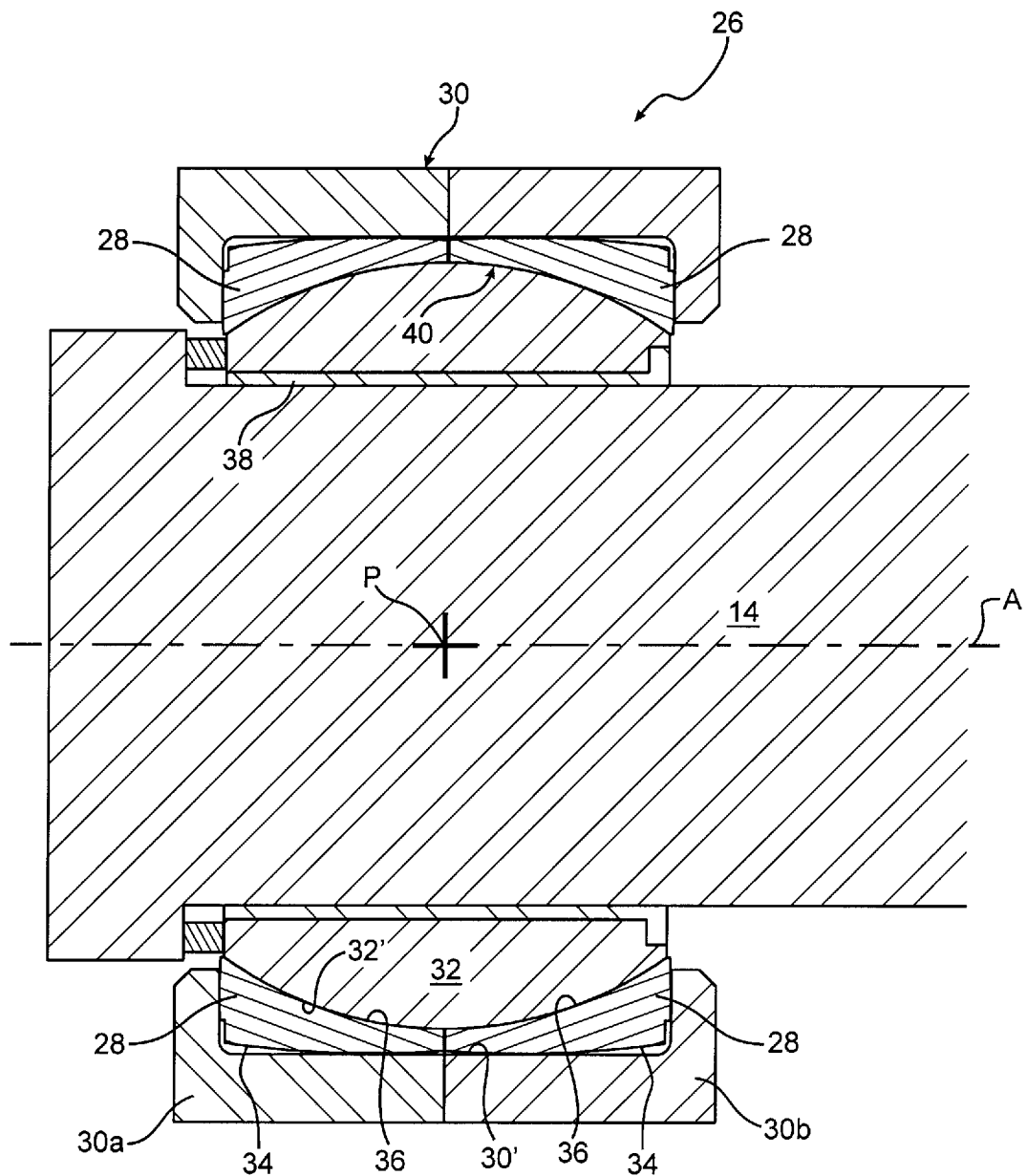
FIG. 2 is a longitudinal sectional view of an oil film bearing depicting an additional exemplary embodiment of the invention.
Figure 3:
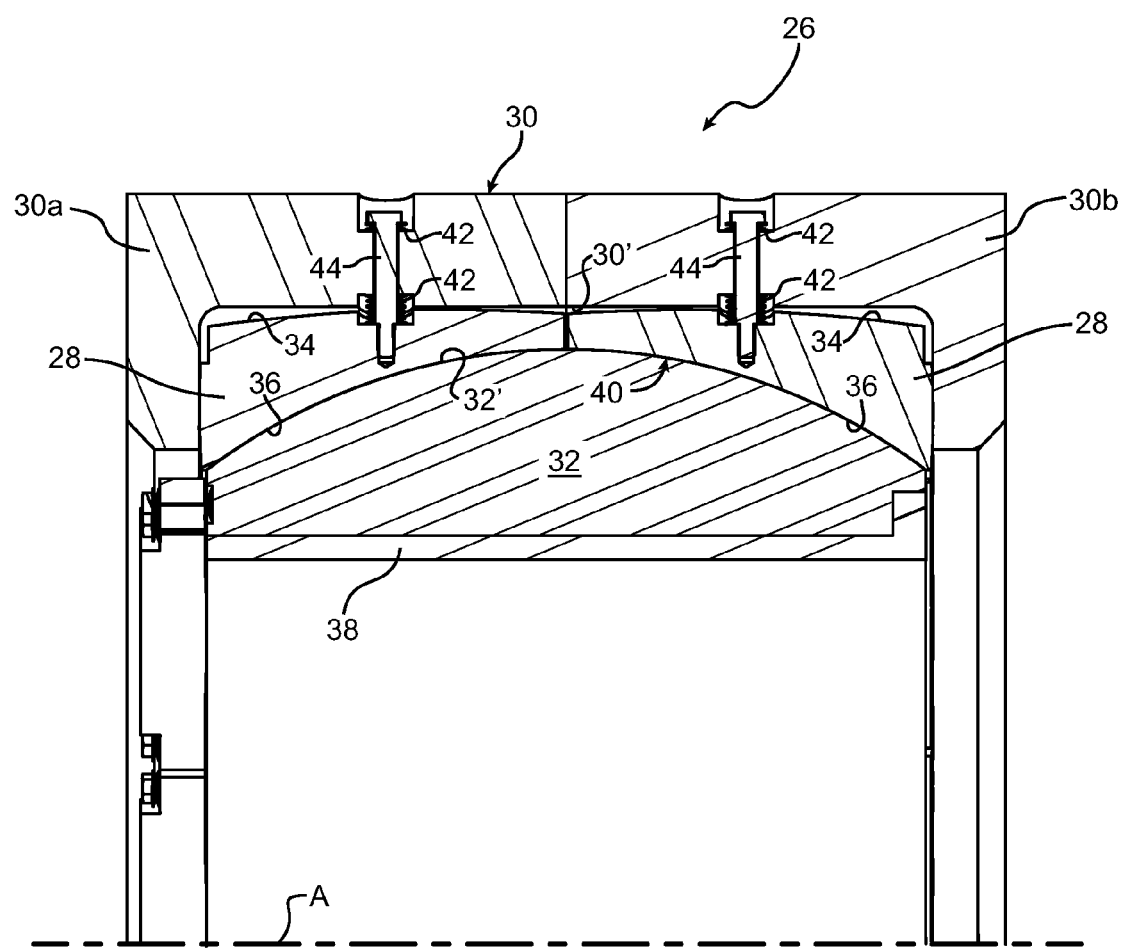
FIG. 3 is an enlarged view of the upper portion of the oil film bearing depicted in FIG. 2, with the bearing removed from the shaft.
Figure 4A:
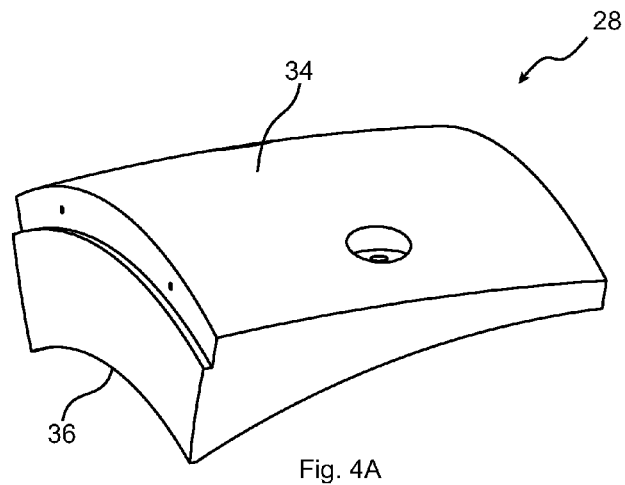
FIG. 4A is a perspective view of one of the inserts depicted in FIGS. 2 and 3.
Figure 4C:
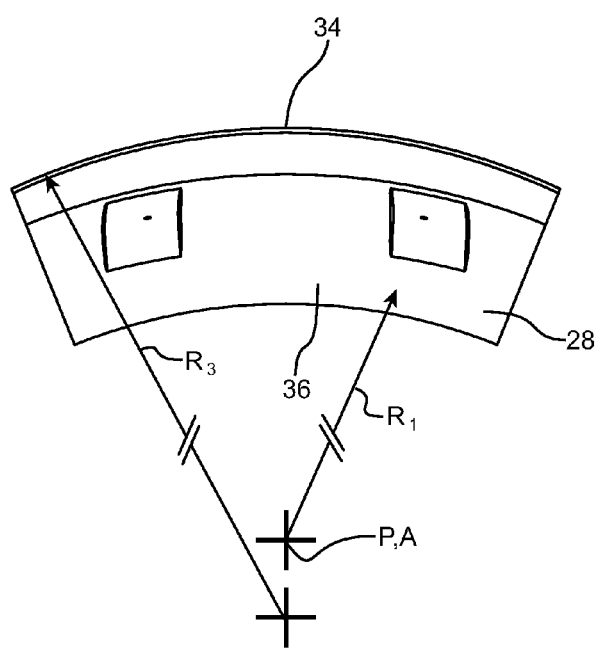
FIGS. 4B and 4C are side and end views respectively of the insert depicted in FIG. 4A.
Figure 4B:
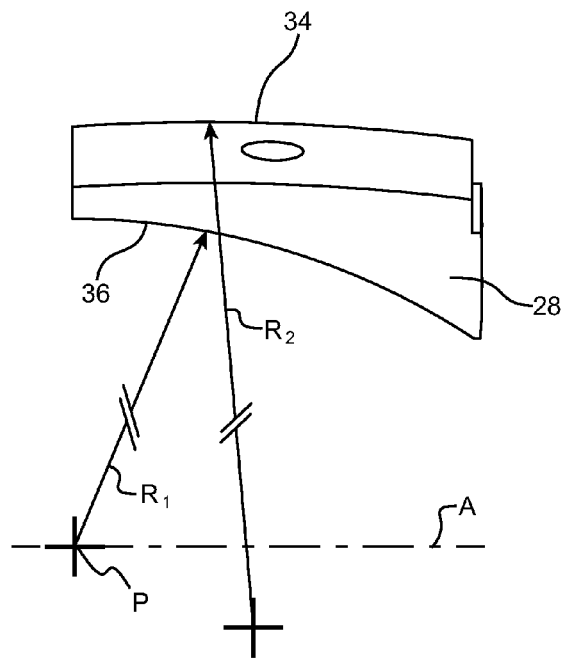

FIGS. 2 and 3 depict another oil film bearing 26 in accordance with the present invention. Discrete inserts 28 are interposed between a cylindrical interior surface 30 of a chock 30 and a spherical housing 32. The chock 30 is again axially subdivided into two mating half sections 30a, 30b. Each chock half section contains a circular array of the inserts. A perspective view of one of the inserts 28 is provided in FIG. 4A. The inserts 28 have three-dimensionally curved outer surfaces 34 in contact with the cylindrical interior chock surface 30, and inner spherical surfaces 36 which combine to form a segmented inner spherical surface of the chock structure. The bore of the spherical housing 32 is lined with a bushing 38 within which the shaft 14 is journalled. The spherical housing 32 has an outer spherical surface 32' which enacts with the inner spherical surfaces 36 of the inserts 28 to define a raceway 40 configured to accommodate angular rotation of shaft 14 about a central point "P". With reference to FIG. 4B, it will be seen that the three-dimensionally curved outer surfaces 34 has a radius of curvature $R_2$ when viewed in planes containing axis A. Similarly, and with reference to FIG. 4C, surface 34 has a radius of curvature $R_3$ in planes perpendicular to axis A. Radius $R_2$ is greater than $R_1$, and radius $R_3$ is less than the radius of the interior cylindrical surface of the chock.

As shown in FIG. 3, spring washers 42 coact with pins 44 to resiliently urge the inserts 28 into contact with the interior surface 30' of the chock.

Figure 5:
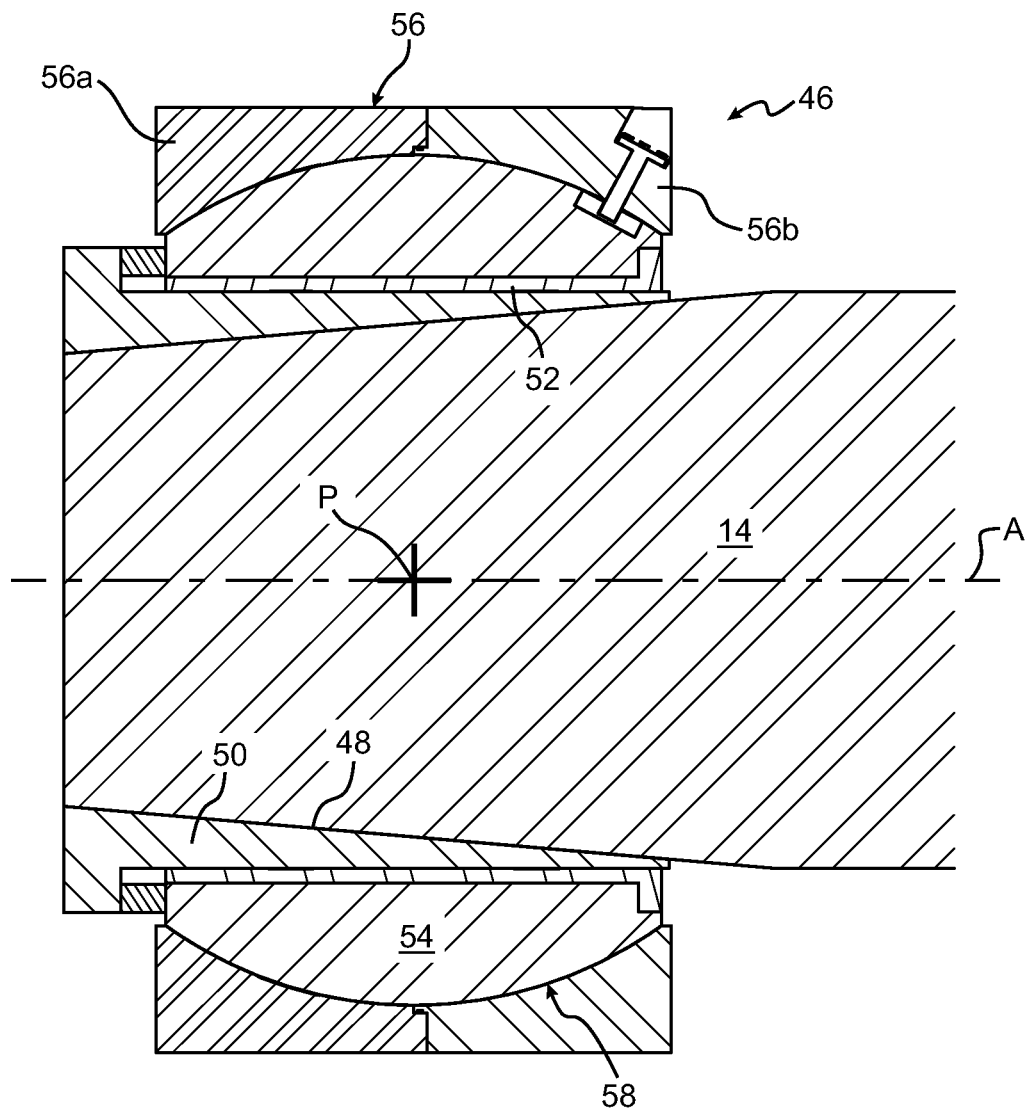
FIG. 5 is a longitudinal sectional view through an oil film bearing in accordance with another exemplary embodiment of the present invention.

FIG. 5 discloses an oil film bearing 46 in accordance with another exemplary embodiment in the invention in which the shaft 14 has a tapered neck section 48. An internally tapered sleeve 50 is axially received on and rotatably fixed with respect to the tapered neck section. The sleeve has a cylindrical outer surface journalled for rotation in a bushing 52 fixed within a spherical housing 54. As with the previously described embodiments, the spherical housing has an outer spherical surface, which in this embodiments, is in contact with the complimentary inner spherical surface defined by two mating half sections 56a, 56b of a chock 56. The complimentary inner and outer spherical surfaces coact in defining a raceway 58 configured to accommodate angular rotation of shaft 14 and central point "P".

In light of the foregoing, it will now be appreciated by those skilled in the art that in each of the disclosed exemplary embodiments, the shafts are journalled for rotation in spherical housing, with the spherical housing in turn being supported for angular rotation about a central point. Thus, the bearing surfaces remain aligned coaxially with the shaft during load induced bending, irrespective of the radial direction of load application. This responsiveness to and accommodation of shaft bending is further enhanced by the interposal of the discrete inserts 28 between the spherical housing and chock interior, as shown in FIGS. 2 and 3.

Although not shown, those skilled in the art will understand that known means are provided for introducing oil between the relatively rotating surfaces of the bearings, e.g., between the shafts and bushings at the bearing load zone, at the raceways defined by coacting inner and outer spherical surfaces, etc.

What is claimed is:

1. An oil film bearing for rotatably supporting a shaft, said bearing comprising:
   a spherical housing having a bore in which said shaft is rotatably supported, said spherical housing having an outer spherical surface; and
   a chock containing said spherical housing, said chock being internally configured with an inner spherical surface coacting with the outer spherical surface of said spherical housing to define a raceway configured to accommodate angular rotation of said shaft about a central point, said inner spherical surface being defined by circular arrays of discrete inserts interposed between a cylindrical interior surface of said chock and said spherical housing, said inserts having spherical interior surfaces.

2. The oil film bearing of claim 1 further comprising a bushing fixed within the bore of said spherical housing, said shaft being journalled for rotation in said bushing.

3. The oil film bearing of claim 2 wherein said shaft has a tapered section, and wherein said oil film bearing further comprises a sleeve interposed between said shaft and said bushing, said sleeve being fixed to said shaft for rotation therewith with a tapered interior surface complimentary to the tapered section of said shaft, and with a cylindrical outer surface journalled for rotation in said bushing.

4. The oil film bearing of claim 1 wherein said inserts have three-dimensionally curved outer surfaces in contact with the cylindrical interior surface of said chock.

5. The oil film bearing of claim 4 wherein said chock is axially subdivided into two mating half sections, each of said half sections containing a circular array of said inserts.

6. The oil film bearing of claim 4 further comprising means for resiliently urging said inserts into contact with the cylindrical interior surface of said chock.

7. The oil film bearing of claim 4 wherein the three-dimensionally curved outer surfaces of said inserts have a radius of curvature greater than the radius of curvature of their spherical interior surfaces in planes containing a bearing central axis, and a radius of curvature less than the radius of curvature of the cylindrical interior surface of the chock in planes perpendicular to the bearing central axis.

8. The oil film bearing of claim 7 wherein said chock is axially subdivided into two mating half sections, each of said half sections containing a circular array of said inserts.

9. The oil film bearing of claim 7 further comprising means for resiliently urging said inserts into contact with the cylindrical interior surface of said chock.

10. The oil film bearing of claim 1 wherein said chock is axially subdivided into two mating half sections.

11. The oil film bearing of claim 10 wherein each of said half sections-contains a circular array of said inserts.

12. The oil film bearing of claim 1 further comprising means for resiliently urging said inserts into contact with the cylindrical interior surface of said chock.

13. The oil film bearing of claim 1 further comprising thrust pads secured to a circular end of said spherical housing, said thrust pads being configured and arranged to axially engage a shoulder on said shaft.

14. An oil film bearing for rotatably supporting a shaft, said bearing comprising:
   a spherical housing having a cylindrical bore lined with a bushing, said bushing being configured and dimensioned for axial insertion onto a cylindrical journal surface of said shaft, said spherical housing having an outer spherical surface surrounding said bushing;
   a chock containing said spherical housing, said chock having a cylindrical interior surface surrounding said spherical housing; and
   discrete inserts interposed between the cylindrical interior surface of said chock and said spherical housing, said inserts having three-dimensionally curved outer surfaces in contact with the cylindrical interior surface of said chock, said inserts defining a segmented inner spherical surface coacting with the outer spherical surface of said spherical housing to define a raceway configured to accommodate angular rotation of said shaft about a central point.

15. An oil film bearing for rotatably supporting a shaft, said bearing assembly comprising:
- a spherical housing surrounding said shaft and within which said shaft is journalled for rotation in a bushing, said spherical housing having an outer spherical surface surrounding said bushing;
- a chock containing said spherical housing, said chock being axially subdivided into two half sections defining a cylindrical interior surface; and
- an array of discrete inserts contained by each of said chock half section, said inserts being interposed between the cylindrical interior surface of said chock and said spherical housing, said inserts defining a segmented inner spherical surface coacting with the outer spherical surface of said spherical housing to define a raceway configured to accommodate angular rotation of said shaft about a central point, said inserts having three-dimensionally curved outer surfaces in contact with the cylindrical interior surface of said chock.

* * * * *